(12) United States Patent
Bounamin Sylla et al.

(10) Patent No.: US 11,863,953 B2
(45) Date of Patent: Jan. 2, 2024

(54) STEREO HEADPHONE AND METHODS FOR CONTENT SHARING AND FOR AUTHENTICATION

(71) Applicants: Omar Bounamin Sylla, Suresnes (FR); Malika Zenzane, Suresnes (FR)

(72) Inventors: Omar Bounamin Sylla, Suresnes (FR); Malika Zenzane, Suresnes (FR)

( * ) Notice: Subject to any disclaimer, the term of this patent is extended or adjusted under 35 U.S.C. 154(b) by 0 days.

(21) Appl. No.: 17/324,805

(22) Filed: May 19, 2021

(65) Prior Publication Data

US 2021/0368269 A1 Nov. 25, 2021

(30) Foreign Application Priority Data

May 20, 2020 (FR) ........................................ 2005163

(51) Int. Cl.
| | |
|---|---|
| *H04R 5/02* | (2006.01) |
| *H04R 5/04* | (2006.01) |
| *H04W 4/80* | (2018.01) |
| *H04W 76/10* | (2018.01) |
| *G06F 3/16* | (2006.01) |
| *H04L 9/32* | (2006.01) |
| *H04R 1/10* | (2006.01) |
| *H04R 5/033* | (2006.01) |

(52) U.S. Cl.
CPC .............. *H04R 5/04* (2013.01); *G06F 3/165* (2013.01); *H04L 9/3226* (2013.01); *H04R 1/105* (2013.01); *H04R 1/1008* (2013.01); *H04R 1/1041* (2013.01); *H04R 1/1066* (2013.01); *H04R 5/0335* (2013.01); *H04W 4/80* (2018.02); *H04W 76/10* (2018.02); *H04R 2420/07* (2013.01)

(58) Field of Classification Search
CPC ......... H04R 5/04; H04R 1/1008; H04W 4/80; H04W 76/10; G06F 3/165
See application file for complete search history.

(56) References Cited

U.S. PATENT DOCUMENTS

| | | | | |
|---|---|---|---|---|
| 10,148,240 | B2 * | 12/2018 | Vilermo | H03G 3/32 |
| 10,687,145 | B1 * | 6/2020 | Campbell | H04H 60/58 |
| 2009/0268921 | A1 * | 10/2009 | Tang | H04R 1/1041 |
| | | | | 381/74 |

(Continued)

OTHER PUBLICATIONS

French Search Report corresponding to French Application No. 2005163 dated Jan. 25, 2021, 3 pages.

(Continued)

*Primary Examiner* — Simon King
(74) *Attorney, Agent, or Firm* — Ronald M. Kachmarik; Cooper Legal Group LLC

(57) ABSTRACT

Stereo headphone and methods for content sharing and for authentication. The stereo headphone includes two earpieces each having a housing, at least one electronic circuit housed in the housing of at least one of the earpieces, configured to allow the headphone to be paired with a remote terminal such as a cellular telephone and to establish a wireless link therewith. The electronic circuit includes an internal memory with more than 32 GB of capacity, an audio player making it possible to play audio files, in particular those saved in this internal memory, and an interface making it possible to select, as the source to be broadcast in the earpieces, the audio player of the headphone or the paired terminal.

18 Claims, 13 Drawing Sheets

(56) References Cited

U.S. PATENT DOCUMENTS

| | | | |
|---|---|---|---|
| 2014/0321662 A1* | 10/2014 | Kihm | H04R 5/0335 |
| | | | 381/74 |
| 2016/0262014 A1 | 9/2016 | Zeng et al. | |
| 2018/0132027 A1 | 5/2018 | Hawkes et al. | |
| 2018/0220219 A1* | 8/2018 | Karacal | H04R 1/1041 |
| 2018/0359552 A1* | 12/2018 | Boesen | G06F 16/60 |
| 2019/0007765 A1* | 1/2019 | Pi | H04R 5/04 |
| 2021/0005213 A1* | 1/2021 | Goldstein | G10L 21/06 |
| 2021/0227312 A1* | 7/2021 | Pornrojnangkool | H02J 9/06 |

OTHER PUBLICATIONS

European Office Action, from Corresponding European Application No. 21 171 200.5, dated Jan. 21, 2022, 17 pages.

Malarie Gokey, "Music-Sharing App Boomio Makes Music Social Again: Digital Trends", Jan. 26, 2015, XP055383652, Extracted from Internet: URL:https://www.digitaltrends.com/mobile/music-sharing-app-boomio-makes-music.social-again/, retrieved on Jun. 21, 2017.

* cited by examiner

STEREO HEADPHONE AND METHODS FOR CONTENT SHARING AND FOR AUTHENTICATION

TECHNICAL FIELD

The present invention relates to a stereo headphone and to associated methods for content sharing and for authentication of the headphone.

PRIOR ART

The high-end stereo headphones available today conventionally comprise an electronic circuit which allows wireless connection, in particular by Bluetooth, to a terminal such as a smartphone, on which the music content to be listened to is stored, or on which a music streaming application is open.

Under certain circumstances, for example due to interference related to the presence of electrical equipment nearby, the quality of the wireless link between the portable device and the headphone may be disrupted, which negatively affects listening quality.

In addition, to preserve the battery life of their portable device, some people would like to be able to minimize its power consumption while listening to a music track, which is not always possible or easy to configure.

It would therefore be advantageous to have a headphone allowing satisfactory listening quality even in the event of interference hindering wireless communication between the portable device and the headphone, and allowing the battery life of the portable device to be preserved if necessary.

Many headphones on the market also have a mechanism allowing the earpieces to be folded inward, in order to reduce their bulk when not in use and to facilitate their storage. Many models thus include a double articulation on the headband, namely a first articulation about an axis passing through the median plane of the earpiece, which makes it possible to orient the earpiece so as to be flat, and a second articulation about an axis perpendicular to the first, in order to fold the earpiece toward the inside of the band.

Such a structure complicates the production of the headphone and may result in greater fragility of the headphone in some cases.

There is therefore a need to improve robustness while retaining a design that makes it possible to significantly decrease the bulk of the headphone when not in use.

It would also still be advantageous to have a headphone that is comfortable to wear, including when around the user's neck, and ergonomic, in particular making it possible to easily stop or resume listening.

Lastly, many users would like to be able to share listening to a music track with other people, and have increased security against the risk of theft. While it is possible to share playlists, the existing solutions do not allow real-time sharing of listening to a track.

US 2014321662 describes a user-programmable, head-supportable listening device. The listening device comprises a user programmable electronics system assembly allowing to scan, detect, select and play audio and video from wired and wireless sources.

DESCRIPTION OF THE INVENTION

The invention aims to meet all or some of the needs mentioned above.

SUMMARY OF THE INVENTION

One subject of the invention is thus, according to a first of its aspects, a stereo headphone comprising at least:
two earpieces each having a housing,
a headband connecting the housings of the earpieces,
at least one electronic circuit housed at least partially in the housing of at least one of the earpieces, configured to make it possible to pair the headphone with a remote terminal such as a cellular telephone and to establish a wireless link therewith, this electronic circuit comprising:
an internal memory, preferably with more than 32 GB of capacity,
an audio player making it possible to play audio files, in particular those saved in this internal memory, and
an interface making it possible to select, as the source to be broadcast in the earpieces, the audio player of the headphone or the paired terminal.

Preferably, the internal memory has a capacity of 64 GB or more, more preferably 128 GB or more.

By virtue of the presence of this internal memory, the user may deposit all of the audio files they wish to be able to listen to into it, and is no longer dependent on the quality of the connection with their portable device when listening to them. The headphone may then be used alone, if the user wishes to switch off their portable device in order to preserve battery life.

The internal memory is preferably not removable by the user without thoroughly disassembling the headphone, i.e. removing parts which are not intended to be removed by the user, and the removal of which may void the manufacturer's warranty.

The internal memory is preferably an electronic memory, integrated into the electronic circuit in the form of one or more memory circuits soldered to or plugged into a connector of the electronic circuit such as an SD card connector for example.

The headphone may be without an SD card-type memory card connector, accessible from the outside of the headphone, or after removing a specific access hatch, visible from the outside of the headphone. This improves reliability and preserves the esthetics of the headphone.

Each earpiece may comprise a cushion of annular shape, preferably with shape memory, designed to rest against the user's ear, mounted removably on the housing of the earpiece. This allows the cushion to be replaced directly by the user, without having to return the headphone to the aftersales service. This also makes it possible to offer the headphone with a plurality of cushion colors, and thus improve its esthetics.

The earpiece housing may have a peripheral groove, this groove preferably being delimited on the cushion side by the edge of a support cup of a speaker and on the other side by an inner cover of the housing of the earpiece, the support cup preferably having a notch open on its periphery, facilitating the insertion of the cushion into the groove with a view to its mounting on and/or its separation from the housing. Thus, the user only has to insert the edge of the cushion into this groove and make one complete turn with the cushion in order to fit the edge into the groove and mount the cushion on the housing of the earpiece. Producing the groove by joining two parts facilitates the production of each part, and makes it possible to produce the notch with a shape that facilitates the insertion of the cushion.

Preferably, the notch serving for the mounting of the cushion is open to the outside through a narrowing, and has a dissymmetric shape; this makes it possible to form a tongue, the tip of which defines the aforementioned narrowing. Such a tongue has a certain degree of flexibility, which makes it easier to introduce the cushion into the aforementioned groove before rotating it on itself in order to gradually insert it thereinto. In addition, the orientation of the tongue may remind the user of the direction of introduction into the groove.

The housing may comprise a body having a lateral wall, preferably of cylindrical shape, and an upper extension, for connection to the headband, molded as one piece with the lateral wall, this extension preferably having an arcuate shape, and at least partially housing a telescopic slide mechanism that makes it possible to adjust the height of the headband with respect to the housings of the earpieces.

The slide may be articulated at its upper end on the central portion of the headband. Thus, each earpiece may have only one degree of freedom in rotation, about a single axis of rotation defined by the articulation. This provides robustness on the mechanical level.

Preferably, the headband comprises a shape memory foam arranged between an outer support, of arcuate shape, and an inner bearing part, produced in an elastomeric material, preferably a silicone, in particular an oil-treated silicone. The presence of this intermediate foam contributes to user comfort.

At least one of the earpiece housings may have, on its outer face, a central part, in particular in the shape of a disk, movable relative to the body of the housing, and which the user can press, this part making it possible to actuate a switch of the electronic circuit, the electronic circuit preferably being produced in such a way that the switch controls the on/off of the headphone in the case of long press, play/pause or answer/end call in the case of a short press. Such control of the switch via the central part, which serves as a sort of large control button, is easy and eliminates having to fumble around in order to find the buttons to press. The user may easily stop listening to a track and resume it, even if they are wearing gloves or holding something in their hand.

The housing which at least partially houses the electronic circuit may comprise a wall for closing the accommodation accommodating the electronic circuit, provided with a chamber which accommodates a board bearing said electronic switch, this chamber being at least partially closed by the central part. This two-stage structure makes it possible to gain in compactness and to have a housing shape of smaller diameter on the side opposite the cushion, which is less bulky and more esthetically pleasing.

The closing wall may have an opening through which passes a connector connecting the board bearing the switch to a main board arranged in the housing, under the closing wall. The mounting of the board bearing the switch may be facilitated thereby.

The central part may bear a logo, among other decorative possibilities. The fact that the central part is produced separately may facilitate decoration thereof. The central part may comprise elastically deformable lugs, which return it to a rest position. These lugs may have been molded as one piece with the central part. The presence of these lugs makes it possible to use a miniature switch, without substantial return force.

Preferably, one of the housings of the earpieces comprises a removable cap defining the outer face, this removable cap allowing access, when removed, to a compartment housing a battery. This housing housing the battery is advantageously different from that accommodating the main circuit board, which makes it possible to balance the weight of the headphone between the left earpiece and the right earpiece.

Preferably, one of the housings bears a jack socket for outputting an analog audio signal and/or one of the housings bears a jack socket for inputting an analog audio signal, and preferably one of the housings bears one of the sockets and the other housing the other socket. Providing sockets on both earpiece housings makes it possible to limit the number of sockets on each housing, and thus preserve the esthetics of the headphone, as well as its balance.

The headphone may comprise at least two buttons arranged on the housing of an earpiece, the electronic circuit being configured such that continuous pressure on one of the buttons corresponds to an increase or decrease in volume depending on the button used, and a close double-press corresponds, depending on the button used, to moving to the next or preceding list. Such control is practical and intuitive.

The electronic circuit preferably comprises an identifier which is specific to the headphone, the electronic circuit being configured to communicate this identifier to the terminal with which it is paired. This identifier is preferably stored in an encrypted manner in the memory of the headphone. The terminal runs an application allowing it to be decrypted, either directly or after exchange with an external server with which the terminal is able to communicate.

Preferably, the headphone may thus communicate with an external server only through a terminal with which it is paired, which makes it possible to avoid installing a complex network communication module on the headphone and makes it possible to outsource the authentication function to an application installed on the terminal, which may benefit from the power of the processor present on it.

The electronic circuit may comprise an NFC communication module. The latter may be used to quickly pair the headphone with the terminal. The headphone may be designed in such a way that the user only needs to place the telephone against the headphone for pairing to take place and to establish the Bluetooth connection.

Advantageously, the headband has a curvature about a first geometric axis contained in a median plane on either side of which the two earpieces are arranged, and a curvature about a second geometric axis contained in the same median plane but substantially perpendicular to the first axis. Preferably, the aforementioned extension, which is formed as one piece with the body of the earpiece housing, forms an upward and inward bend when the headphone is viewed from the rear with the central portion of the headband facing the viewer, oriented so as to be curved downward. Such an undulating shape provides more clearance for the central portion of the headband when the headphone is left around the neck without being put over the ears, and therefore greater comfort. It also allows substantially parallel positioning of the axes of the articulations allowing the earpieces to be folded, ensuring greater compactness after folding the headphone.

The presence of the aforementioned extensions, which extend the housings of the earpieces upward and which house the slides allowing the height to be adjusted, makes it possible to shift the articulations upward, and therefore to fold the earpieces over a larger radius to result in a relatively compact storage configuration, without having to provide a double articulation on each earpiece. This makes it possible to gain in compactness, robustness and reliability.

Another subject of the invention, according to another of its aspects, is a method for near-instantaneously sharing an item of content between at least two users each equipped with a headphone as defined above, and with a terminal such as a cellular telephone running a content-sharing application with which the headphone is paired, these users having previously registered their headphone on a server, this method comprising the steps of:

allowing a user to select at least one item of content to listen to and at least one other user with whom they wish to share the listening to this item of content, uploading the item of content to a streaming server, relaying, using the streaming server, this item of content thus uploaded to the one or more selected users.

The method may comprise sending, to the one or more users selected for sharing the item of content, the URL of the shared stream, an identifier of the user wishing to share an item of content, in particular the user's name, and an identifier of the shared item of content, in particular at least one out of the name of the shared track, the author of the track, its duration, the number of people with whom the track is shared, the duration of the stream, the audio resolution, the name of the album, an image of the tracks sleeve, the name of the publisher and/or of the record company.

The shared item of content may be stored in the internal memory of the user who wishes to share the track. As a variant, this shared item of content is saved in the memory of the terminal. As a further variant, this item of content is received by the terminal by streaming.

Preferably, the method is such that:

a) assuming that a user selected for sharing the item of content has their application already open on their terminal, the application generates a visual, touch and/or sound notification inviting the user to listen to the shared item of content, and if the user accepts to start streaming the shared item of content, the application interrupts current listening in order to transmit the stream of the shared item of content to the headphone for them to listen to in near-real time, b) assuming that the application is not open on the user's terminal, the terminal displays a notification linked to the application which invites the user to open the application in order to listen to the shared item of content by streaming.

Another subject of the invention, according to another of its aspects, is a method for authenticating a headphone according to the invention, as defined above, comprising an identifier stored in an encrypted manner in its memory, this method comprising the steps of:

pairing the headphone with a terminal running an application, transmitting the encrypted identifier to the application, entering, in the application, a code provided with the headphone when it is acquired, comparing the code with the identifier, this comparison being carried out automatically within the application, and in the case of a match between the two, making it possible to register the headphone on a remote server.

The server may store, during this registration, a serial number of the headphone, an email address of the user associated with the headphone and their telephone number. The authentication method may provide, in the case of the headphone being connected to an application which does not recognize it, for example following transfer of ownership of the headphone or theft thereof, for the application to ask the user for the serial number of the headphone to allow the user to access the functionalities of the application. The application may transmit this serial number to the server, for verification.

Preferably, the headphone is designed such that an unauthenticated headphone does not allow the dedicated application to be used but leaves the other functionalities operational.

In one exemplary implementation, to authenticate a headphone, the latter being assigned to an owner, the following steps are implemented (A):

when the headphone is used for the first time (blank or unassigned headphone), the application requests the serial number of the headphone and a set of information from the user, for example name, telephone number and email address; for example, the serial number provided to the user on their warranty card may be scanned by the application or entered manually;

the application compares the entered or scanned number with the number that it extracts in an encrypted manner from the headphone;

if the serial number matches, the user information is used to associate it with the headphone via the server; this operation requires an Internet connection;

the server checks that the serial number has not been assigned to another user and that the serial number corresponds to an authentic headphone and is not on the list of serial numbers corresponding to stolen or lost headphones (blacklist) available to it;

if the server approves the operation, it stores the assignation of the headphone to the user and authorizes the application to continue the association;

the application injects a user identifier into the headphone;

the headphone is authenticated at this stage and the application stores it in the list of valid devices (in the cache of the application).

When using a headphone previously authenticated by another user:

When launching the application on a terminal such as a telephone of another user who has not performed the above operations (A), the application requests the serial number of the headphone without the user's contact details;

the user must have the warranty card in order to scan or write the serial number;

the application compares the entered or scanned number with the number that it extracts in an encrypted manner from the headphone;

if the serial number matches, a check is performed by communicating the serial number to the server. This operation requires an Internet connection.

the server checks that the serial number corresponds to an authentic headphone and is not on a blacklist available to it;

if the server approves the operation, the application stores the headphone in the list of valid devices (in the cache of the application).

the information concerning the original user is retrieved from the server but is only partially visible to the user of the application, who may modify it only after verification.

Modifying the data:

Preferably, any operation of modifying user data (email, telephone number) or removal from the headphone (deleting the headphone-user link) requires that the serial number be entered; the application then validates the entered serial number with that of the headphone;

if the serial number matches, the modified information is sent to the server. This operation requires an Internet connection.

the server checks the consistency of the old data for the modification, that the serial number does indeed correspond to an authentic headphone and is not on a blacklist available to it;

if the server approves the operation, it stores the changes and authorizes the application to continue with the modification; the application modifies the data in the headphone (deletion or modification of the user identifier) and then the application modifies the information for the headphone in the list of valid devices (in the cache of the application).

BRIEF DESCRIPTION OF THE DRAWINGS

The invention may be better understood from reading the following detailed description of a non-limiting exemplary implementation thereof, and from examining the appended drawing, in which.

DETAILED DESCRIPTION

The headphone 1 according to the invention, shown in the figures, comprises two earpieces 2, left and right, connected by a band 3.

Figure 1:
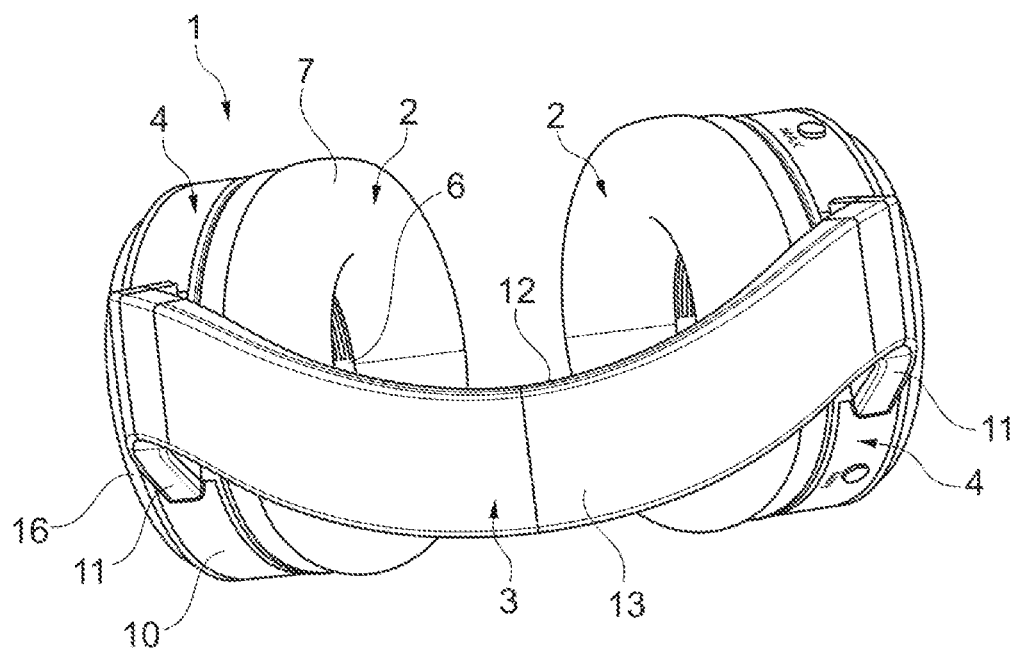
FIG. 1 is a rear view of an exemplary headphone according to the invention.

Each earpiece 2 comprises a housing 4 containing at least one speaker 5, visible in FIG. 1, covered by a grille 6. Each housing 4 bears an annular cushion 7, made of a flexible material.

Each housing 4 comprises a body 10 having a lateral wall, for example of the general shape of a cylinder of revolution, extended upward by an extension 11 molded as one piece of plastic material with the rest of the body 10.

The extension 11 is slightly curved upward and inward when the headphone is viewed from the rear as in FIG. 1, and the band 3 comprises a central portion 13 having an upwardly concave arcuate shape, which gives the complete band an undulating shape, thereby improving the comfort of wearing the headphone when it is around the neck, the upper edge 12 of the central portion 13 of the band being designed to follow the shape of the back of the neck.

Figure 3:
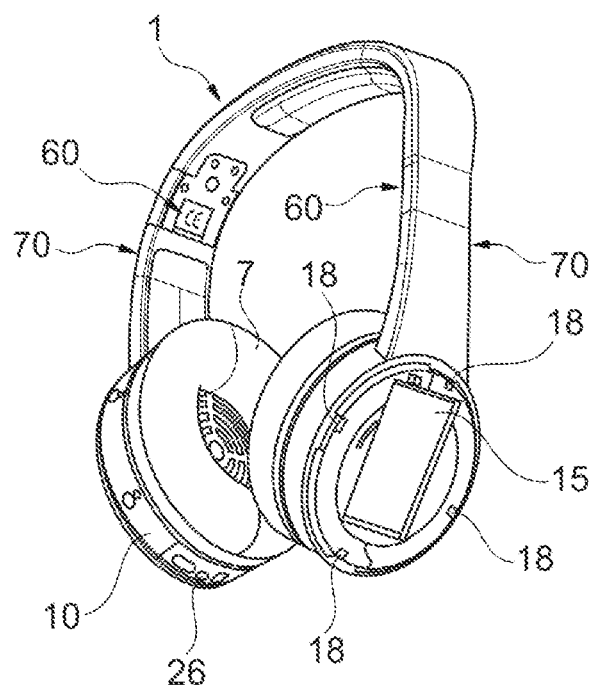
FIG. 3 illustrates the removal of the cap giving access to the battery accommodation.
Figure 5:
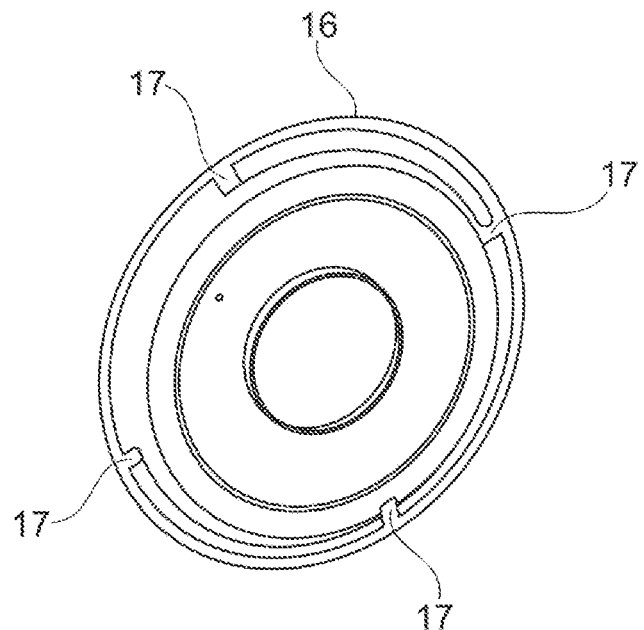
FIG. 5 shows, in isolation, the cap closing the battery accommodation.

One of the housings 4, in this case that of the right earpiece in FIG. 3, houses a battery 15, accessible after removal of a removable cap 16, shown in isolation in FIG. 5. This cap 16 may be fixed in place by way of a rotational movement on the housing 4, by virtue of locking teeth 17, inserted into corresponding notches 18 made in the housing 4.

Figure 11:
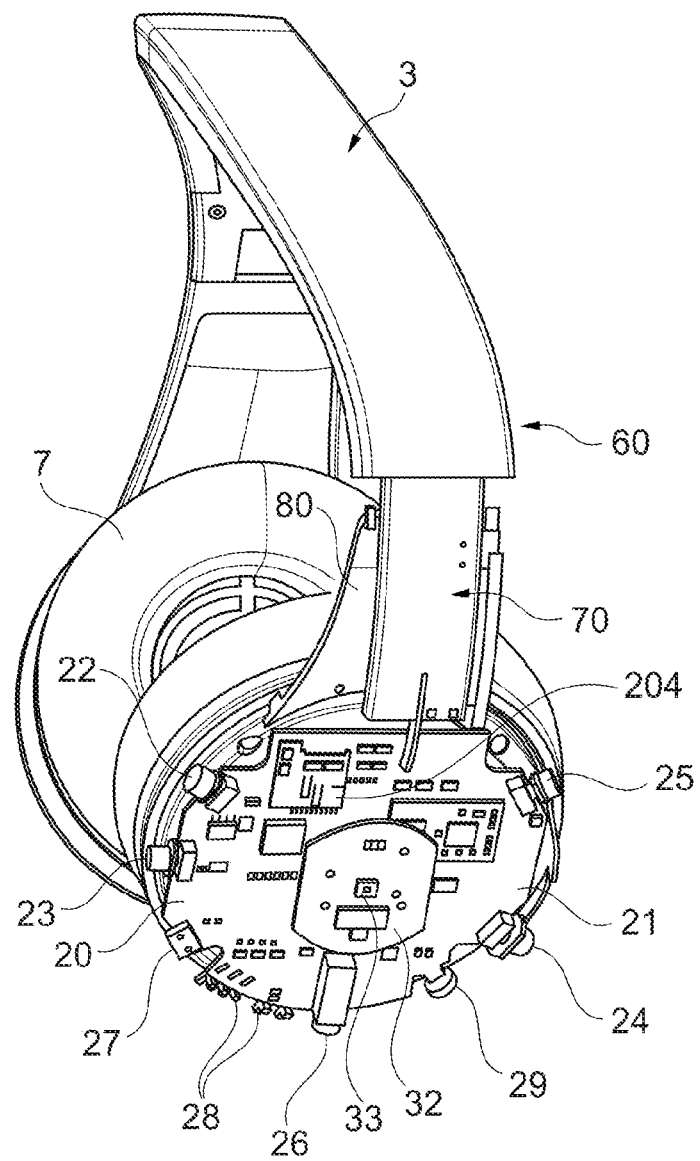
FIG. 11 shows the headphone after removal of the housing body.

The other housing 4, namely the left one in FIG. 3, houses a main electronic circuit 20, visible in FIG. 11.

This circuit 20 comprises a printed circuit board 21, which bears control buttons 22, 23, 24 and 25 accessible through openings made in the periphery of the body 10 of the housing. The board 21 also bears a jack socket 26 and a connector 27, for example of USB type, for supplying power to the headphones. Optical guides 28 opening onto the outside of the housing are illuminated by various LEDs mounted on the board 21.

The electronic circuit 20 is configured, for example, such that a continuous pressure on one of the buttons 22 and 23 corresponds, depending on the button, to an increase or to a decrease in volume, and that a close double-press corresponds, depending on the button used, to moving to the next or preceding list.

The button 24 may serve to have the battery level displayed and the button 25, with a short press, to select the source, for example either an external source communicating by Bluetooth such as a smartphone, or the internal memory, and with a long press, to cause wireless pairing, for example by Bluetooth in a conventional manner, or pairing with a dedicated application run by the device with which the headphone has been paired beforehand. The electronic circuit may be designed so that a predefined pressing of the control buttons, for example simultaneously pressing all of the buttons, causes the headphone to be reset.

Each earpiece may comprise a microphone 29, that of the earpiece comprising the main electronic circuit 20 being borne by the board 21.

The jack socket 26 may serve as an audio input and/or as a link to a remote control device mounted on the cable connected to this jack socket.

The jack socket 58 on the other earpiece may serve as an analog audio output.

The electronic circuit 20 may also comprise an NFC module 209 allowing fast pairing of the headphone with a smartphone having this functionality.

Figure 4:
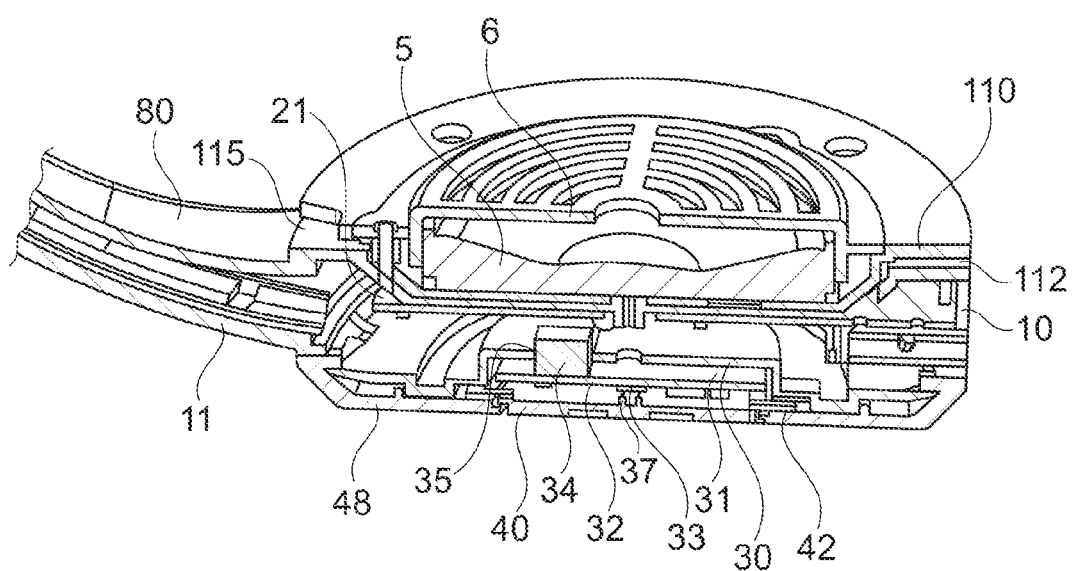
FIG. 4 is a schematic and partial cross section of an earpiece.

The body 10 of the housing 4 has a closing wall 30, visible in FIG. 4, which has a chamber 31 for housing a printed circuit board 32, bearing a switch 33.

The board 32 bears a connector 34 which is plugged into the board 21 through an opening 35 in the wall 30 opening into the bottom of the chamber 31.

The switch 33 is controlled by a central part 40, shown in isolation in FIG. 11, mounted on the wall 30 with the possibility to move relative thereto. The central part 40 may have, as illustrated, a central pin 37 which presses the switch 33.

Figure 6:
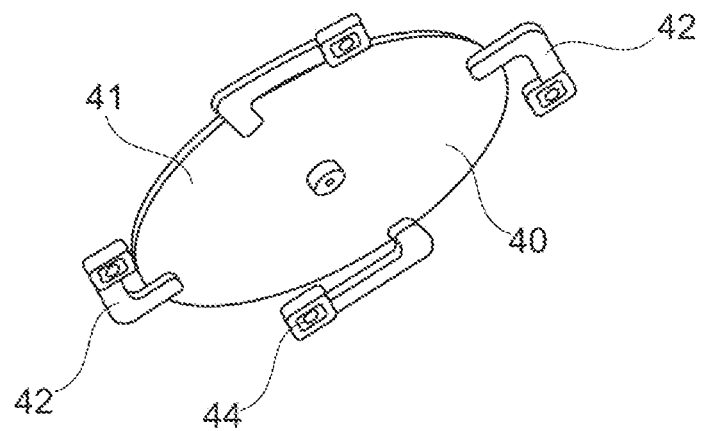
FIG. 6 shows, in isolation, the central part for controlling the switch.
Figure 7:
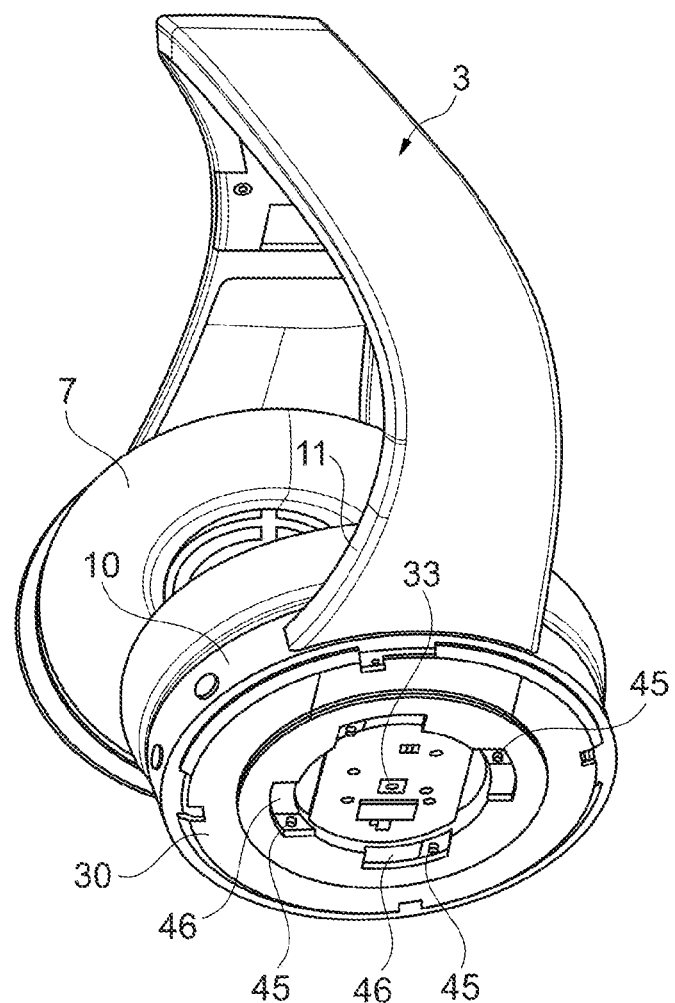
FIG. 7 shows the headphone after removal of the outer cap and of the central part for controlling the switch.
Figure 8:
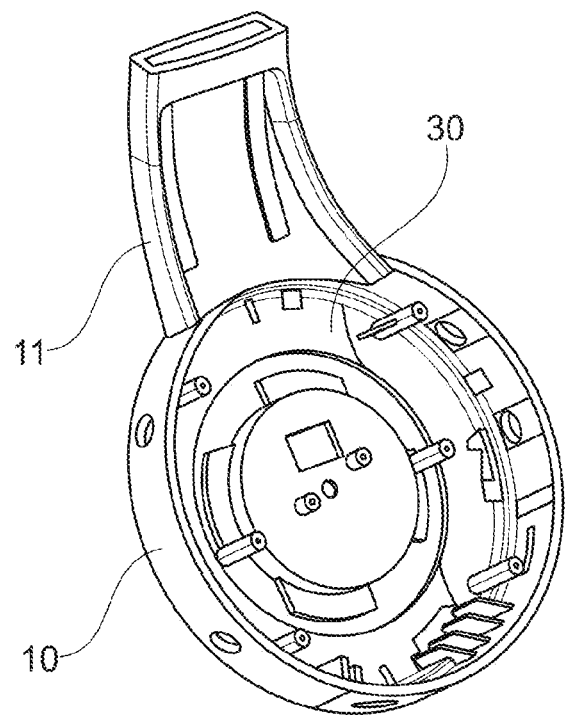
FIG. 8 shows, in isolation, the part forming the body of the earpiece housing.

The central part 40 comprises, as illustrated in FIG. 6 in particular, a disk 41, which may bear a logo on its outer face, and elastic lugs 42 which ensure that the disk 41 is held in place while allowing it to be depressed in order to actuate the switch 33. The lugs 42 have, for example, at the end, a hole 44 for fitting onto a corresponding pin 45 on the body 10. Clearances 46 are made in the body 10 in order to accommodate the lugs 42 and allow them to deform by bending when the user presses the central portion 40.

The central part 40 is held on the body 10 by a cap 48, similar to the cap 16 of the other earpiece, except for the presence of the opening accommodating the central part 40.

The electronic circuit of the headphone is preferably produced in such a way that the switch 33 controls the on/off of the headphone in the case of a long press, play/pause or answer/end call in the case of a short press. The central part 40 serves as a sort of large control button, which saves the user having to fumble around in order to find the button to press for a function as important as pausing listening or answering/ending a call.

Figure 12:
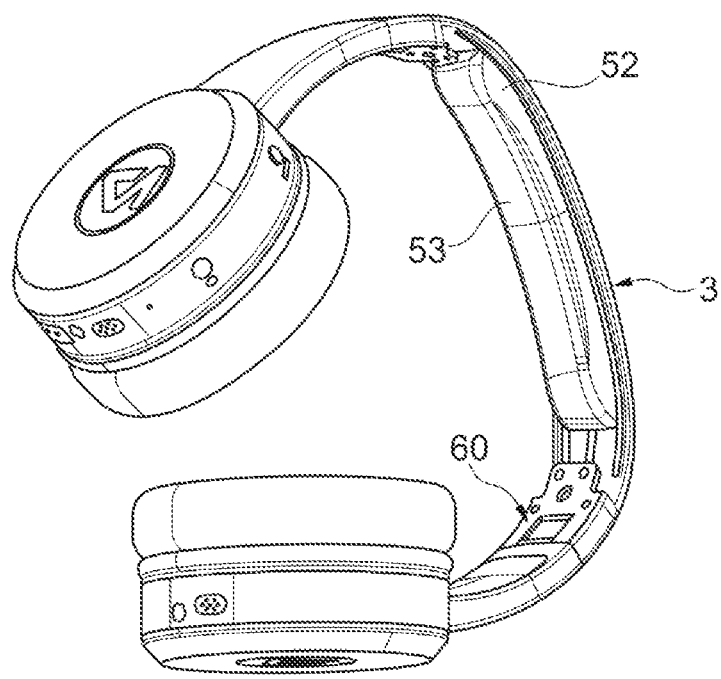
FIG. 12 shows the headband without the bearing part.

The band 3 comprises, on the inner face of its central portion, a bearing part 50, made of elastomeric material, visible in particular in FIG. 12, the elastomeric material being for example a silicone treated with oil in order to be softer to the touch.

Figure 13:
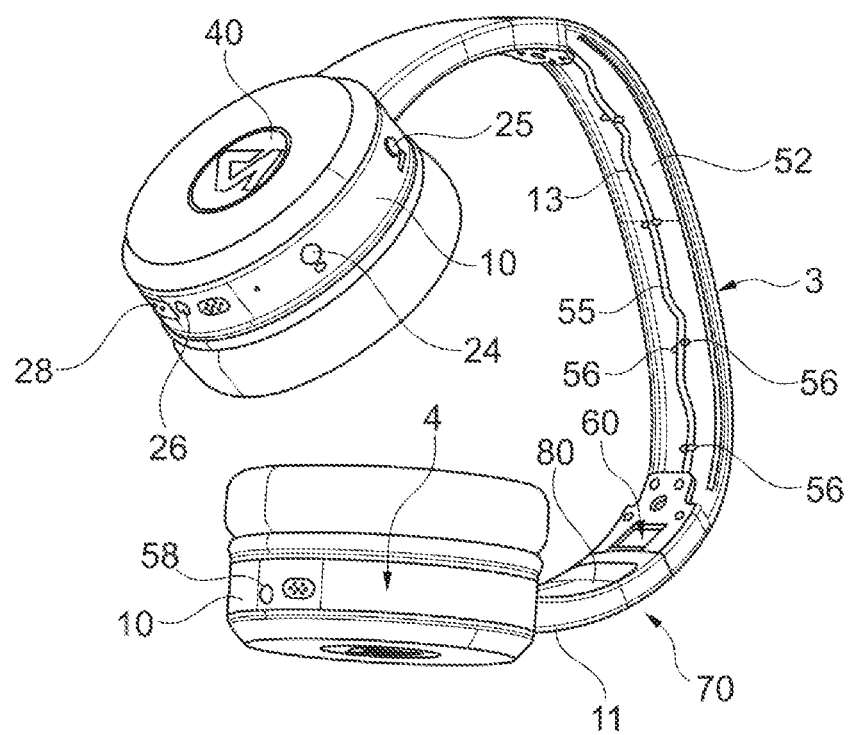
FIG. 13 is a view similar to FIG. 12 with the shape memory foam removed.

The outer face of the central portion of the band 3 is defined by a rigid part 52, visible in FIG. 13, which bears a foam 53 made of a shape memory material. FIG. 13 shows a cable 55 connecting the left and right earpieces, extending under the foam 53, between pairs of guide pins 56.

The headphone 1 comprises articulations 60 making it possible to rotate the earpieces 2 toward the inside of the band 3 in order to decrease its bulk when not in use.

These articulations 60 are present at the upper end of slide mechanisms 70, serving to adjust the height of the band 3.

Figure 14:
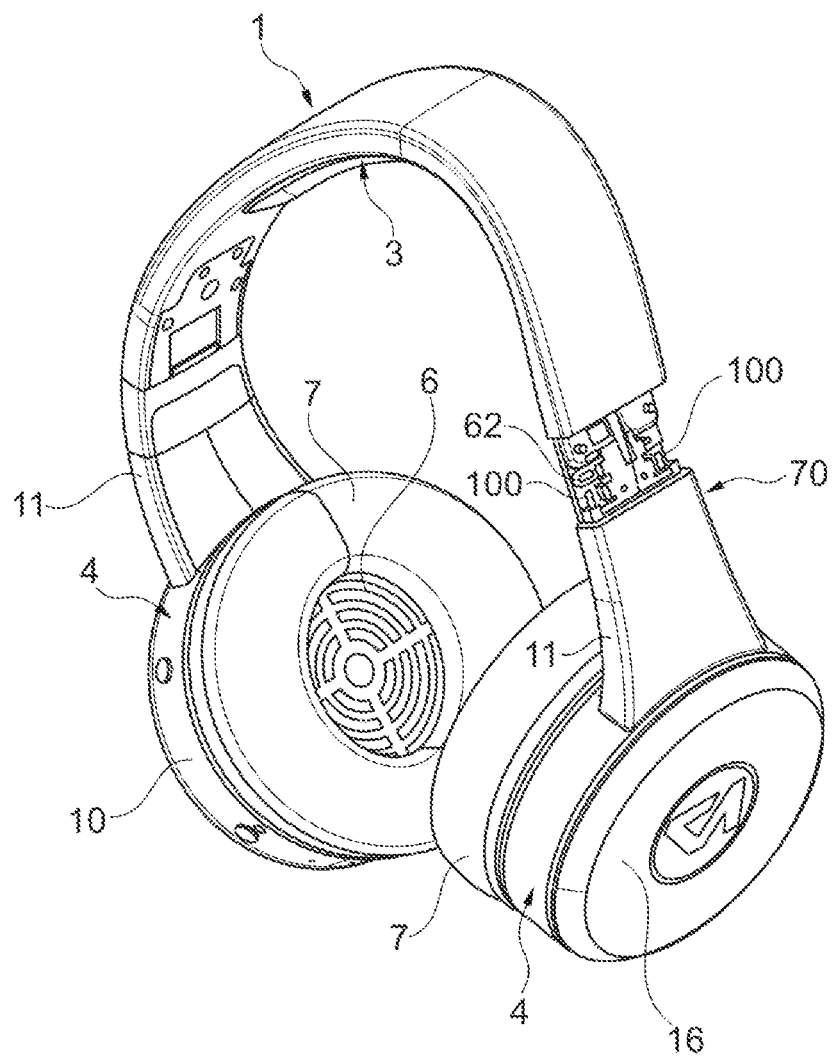
FIG. 14 illustrates the construction of the hinge.
Figure 15:
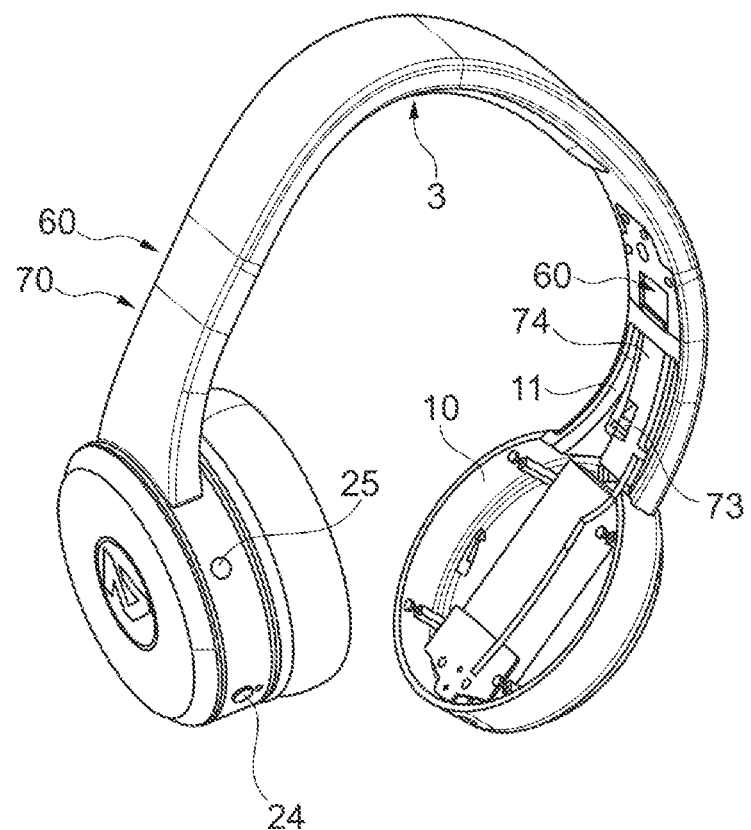
FIG. 15 shows the headphone after removal of some of the components of an earpiece.

Each articulation 60 comprises a shaft 62, preferably made of metal, visible in FIG. 14, which serves as a pivot.

Figure 9:
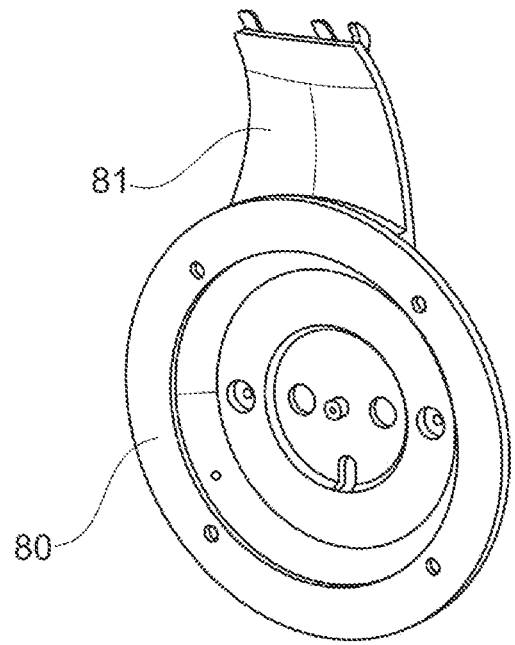
FIG. 9 shows, in isolation, the cover for closing the earpiece housing.
Figure 10:
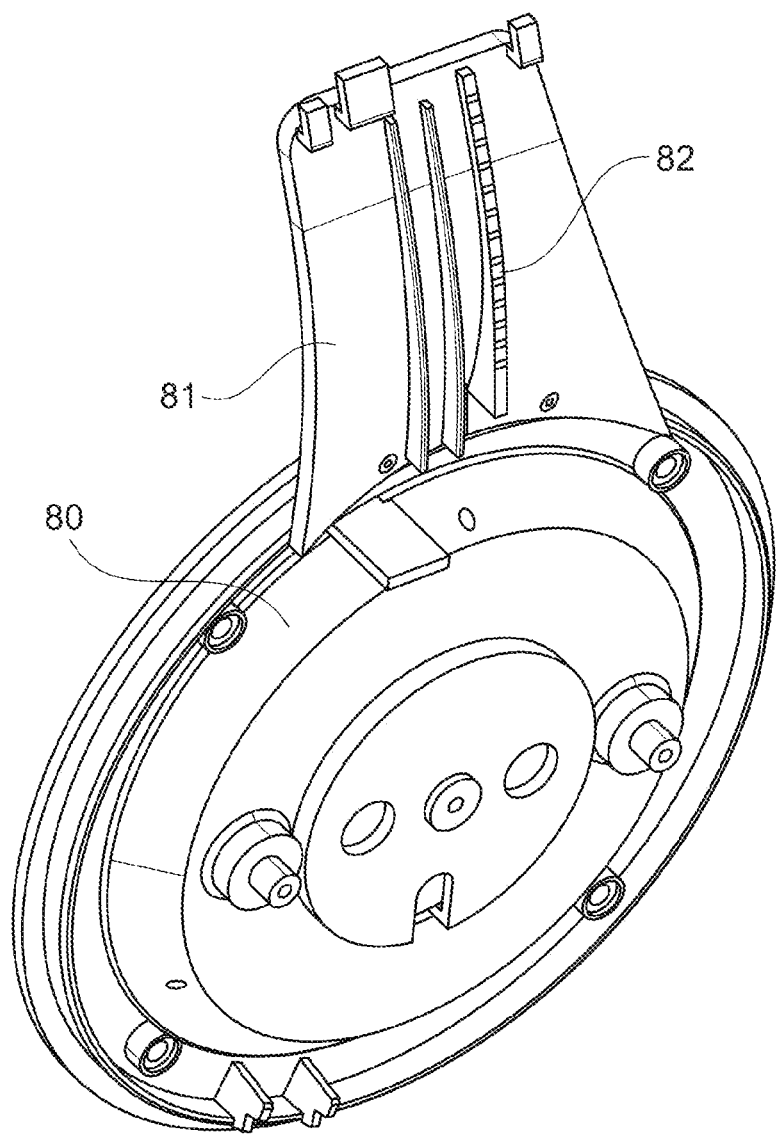
FIG. 10 shows the part of FIG. 9 from another viewing angle.

Each housing 4 body 10 is closed, on the cushion 7 side, by a cover 80, visible in FIG. 9. This cover 80 comprises an extension 81, molded as one piece of plastic material with the rest of the part, which bears, on its inner face, a toothing 82 defining notches for adjusting the height of the band 3.

Figure 16:
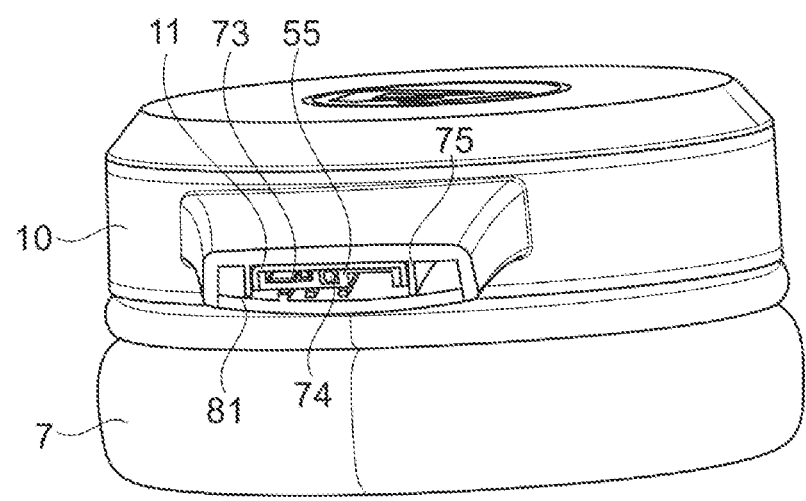
FIG. 16 is a schematic and partial cross section of the headband.

FIG. 16 shows that the slide mechanism 70 comprises two metal elements 74 and 75 that can slide one inside the other, the innermost element 74 bearing a slider formed by an elastic strip 73, which rubs on the toothing 82, each notch thereof defining one possible adjustment position.

The presence of the articulations 60 above the slide mechanisms 70 makes it possible to bring the earpieces closer to the top of the band 3 when they are folded inward, which makes it possible to gain in compactness.

Elastic lugs 100, present at the articulations 60, visible in FIG. 14, ensure that the earpieces are held in the listening position when the headphone is in use.

A cup 110 for supporting the speaker 5 is attached externally to the cover 80 and forms, with the latter, an annular groove 112 serving for the installation of the cushion 7, as can be seen in FIG. 4 in particular.

The cushion 7 comprises a fabric intended to cover the grille 6 and an edge intended to be inserted into the groove 112 in order to hold the cushion in place on the housing 4.

Figure 2:
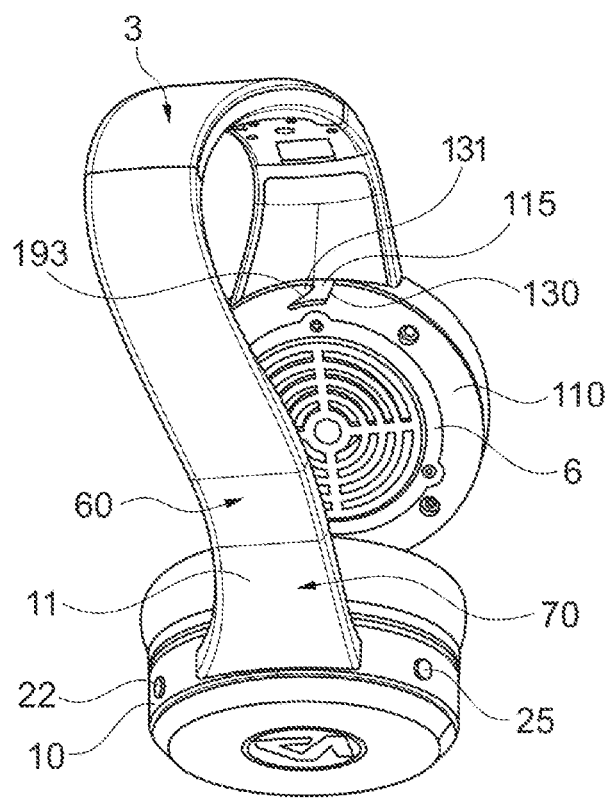
FIG. 2 is a perspective view of the headphone from another viewing angle, with one of the earpiece cushions removed.

To facilitate mounting of the cushion 7 on the housing, the cup 110 has a notch 115, as illustrated in FIG. 2, opening onto its periphery, into which the edge of the cushion 7 can be inserted in order to be introduced into the groove 112. In order to mount the cushion, all that has to be done is then to rotate the latter relative to the housing over one complete turn, in order to gradually insert the entire edge into the groove 112.

The notch 115 is delimited on one side by an inclined edge 130 and on the opposite side by a tongue 131, the tip of which defines a narrowing of the opening of the notch 115.

The tongue 131 defines, with the bottom of the notch, a slot 133.

The edge 130 is inclined toward the bottom of the notch 115 and toward the tongue 131.

The tongue 131 has a certain degree of flexibility, which facilitates the introduction of the cushion into the groove 112.

Figure 17:
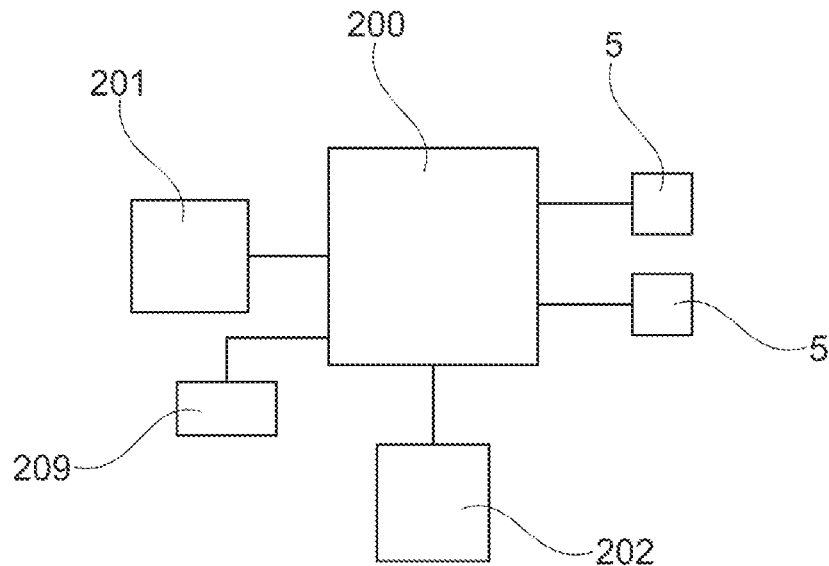
FIG. 17 is a block diagram of the electronic circuit of the headphone.

The headphone 1 comprises, as illustrated in FIG. 17, a central unit 200 which manages its operation. It is for example a central unit with a microcontroller, forming part of the electronic circuit 20 and programmed to provide the various functions of the headphone. This central unit 200 may in particular comprise an audio player, making it possible to play audio files stored in the internal memory 202 of the headphone, for example files with the format extensions .mp3, .wav, .aif, .caf, .cda, .raw .fla, .m4a, .wma, .vqf, .aac, .mpx4, among others, the invention not being limited to a particular format.

FIG. 17 schematically shows the speakers 5 and the user interface 201, which comprises all means allowing the user to enter instructions, and in particular the various control buttons described above, and preferably a voice interface, the central unit 200 advantageously being configured to allow voice control of certain functions of the headphone, preferably via the one or more microphones integrated into the earpieces.

The internal memory 202 is for example a memory card, in particular in the form of an SD card, accommodated in a corresponding internal connector 204 of the main electronic circuit. The term "SD card" should be understood to mean any memory card format, in particular Micro SD or the like.

The capacity of the internal memory 202 is preferably higher than or equal to 128 GB.

Figure 18:
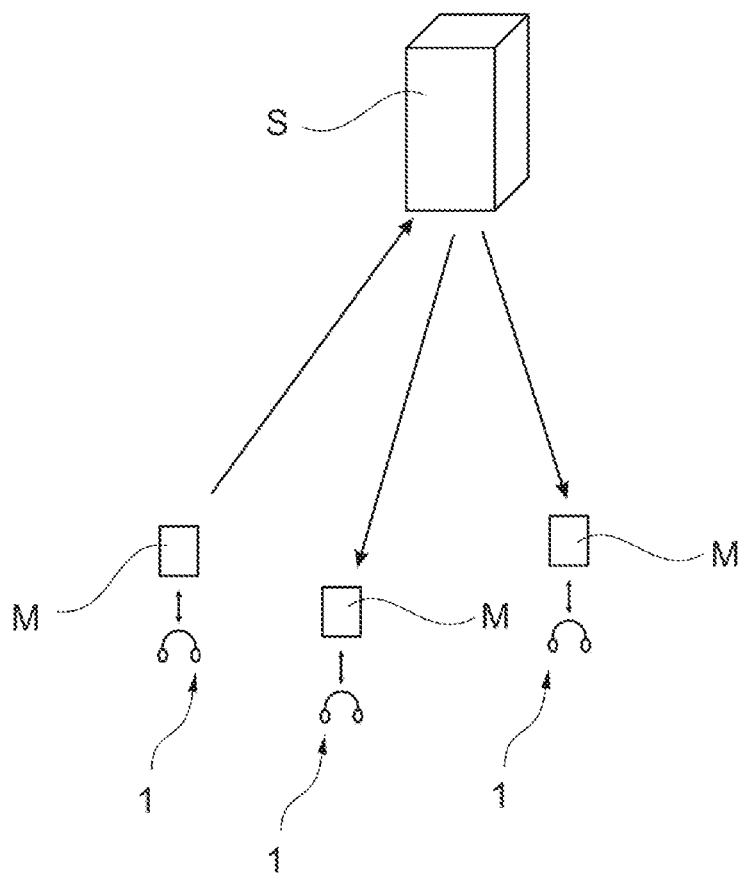
FIG. 18 illustrates the broadcasting of an item of content to other users.

The headphone 1 comprises a circuit that allows it to communicate via a wireless link, for example Bluetooth, with a terminal connected to the Internet, for example a cellular telephone M, as illustrated in FIG. 18.

An item of content stored on this terminal M may be saved to the internal memory of the headphone.

The terminal M may download, from a server, an application offering numerous functionalities, as described below.

The application may in particular allow the user of the headphone to share an item of content near-instantaneously with at least one other user equipped with a similar headphone, also paired with a similar terminal connected to the Internet.

Headphones 1 that can share an item of content are registered on a server S.

The application allows the user who wishes to share an item of content to select, in step 300, at least one item of content to listen to and at least one other user with whom they wish to share the listening to this item of content. The application is programmed to upload the item of content thus selected to a streaming server, which, in the example illustrated, is assumed to be the same server S, but which could be different.

The streaming server can relay the item of content thus uploaded to the one or more selected users and thus send, to the one or more users selected for sharing the item of content, the URL of the shared stream, the identifier of the user wishing to share an item of content, in particular the user's name, and an identifier of the shared item of content, in particular the name of the shared track. Where applicable, the server also transmits the author of the track, its duration, the number of people with whom the track is shared, the duration of the stream, the audio resolution, the name of the album, an image of the tracks sleeve, the name of the publisher and/or of the record company.

Figure 19:
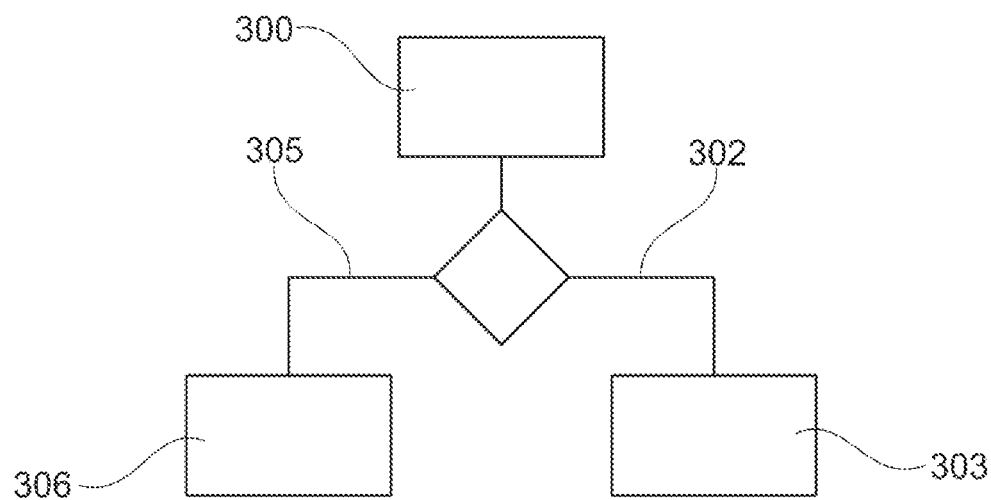
FIG. 19 shows steps of the content broadcasting method.

If the user selected for sharing the item of content has their application already open on their terminal, which corresponds to step 302 in FIG. 19, the application generates a visual, touch and/or sound notification inviting the user to listen to the shared item of content, and if the user accepts to start streaming the shared item of content, the application interrupts, in step 303, current listening in order to transmit the stream of the shared item of content to the headphone for them to listen to in near-real time.

If the application is not open on the users terminal, which corresponds to step 304 in FIG. 19, the terminal displays, in step 306, a notification linked to the application which invites the user to open the application in order to listen to the shared item of content by streaming. The person who receives the shared track may only listen to it, the title remaining the property of the sender. The application may be produced in such a way that a shared track, once expired, may be purchased later from the application via a music service.

Where applicable, the application also allows the users thus sharing an item of content to chat via written, audio or video messages, via their applications or dedicated messaging applications. Thus, the application may provide a "chatroom" allowing them to instantly discuss the shared track.

The headphone 1 preferably comprises an identifier stored in its memory 202 in an encrypted manner.

In this case, the electronic circuit of the headphone, the application and the server are advantageously designed so as to allow the implementation of the following authentication method.

Figure 20:
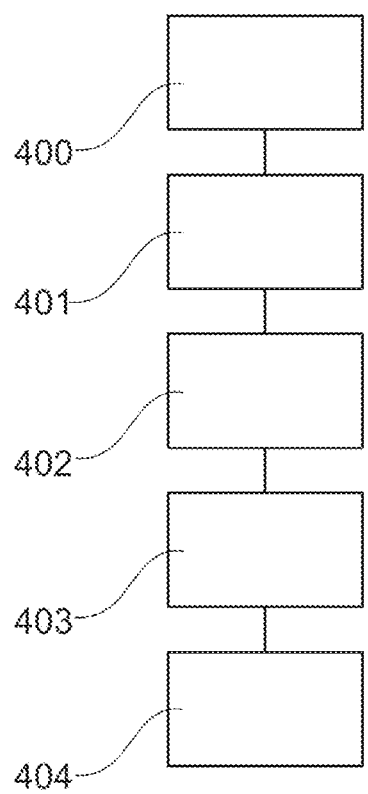
FIG. 20 shows steps of the method for authenticating the headphone.

First of all, the method comprises the step of pairing the headphone 1 with a terminal M running the application, which corresponds to step 400 in FIG. 20.

Next, which corresponds to step 401, the headphone transmits the encrypted identifier contained in its memory to the application.

The application then invites, in step 402, the user to enter, on the terminal, a code provided with the headphone when it is acquired, this code being, for example, a serial number written on an authentication card. The product may also be authenticated by scanning a QR code present on the authentication card using a scanner function allowed by the application.

The application compares, in step 403, the code with the decrypted identifier, and in the case of a match between the two, makes it possible, in step 404, to register the headphone on the remote server.

This comparison step should be understood in the broad sense, and relates to a direct comparison of the code with the decrypted identifier, or an indirect comparison, for example of a hash of the code with a hash of the identifier.

Once this comparison has been carried out, if it is positive, the server may store, if it does not already know them, the serial number of the headphone, an email address of the user associated with the headphone and their telephone number.

In the case of the headphone being connected to an application which does not recognize it, for example following transfer of ownership of the headphone or theft thereof, for the application to ask the user for the serial number of the headphone to allow the user to access the functionalities of the application.

The headphone 1 is preferably configured to make it possible to view, with the application running on the paired terminal, the list of files saved in the internal memory of the headphone 1, and to perform deletions or additions.

The application may be designed to display a page allowing the user to select, from the paired terminal, the source they wish to listen to.

The invention is not limited to the example that has just been described.

For example, numerous modifications may be made to the headphone, depending on the functionalities sought. In particular, the way in which the earpieces are connected to the headband may be modified, as may the way in which the speakers are mounted inside the earpieces.

An ambient noise reduction feature may be added to the headphone, if desired.

The invention claimed is:

1. A stereo headphone comprising at least:
two earpieces each having a housing,
a headband connecting the housings of the earpieces,
at least one electronic circuit housed at least partially in the housing of at least one of the earpieces, configured to pair the headphone with a remote terminal such as a cellular telephone and to establish a wireless link therewith, the electronic circuit comprising:
an internal memory with more than 32 GB of capacity,
an audio player to play audio files saved in the internal memory, and
an interlace making possible to select, as the source to be broadcast in the earpieces, the audio player of the headphone or the paired terminal,
wherein
at least one of the earpiece housings having an outer face and on the outer face a central part movable relative to the body of the housing, and which a user can press, the central part being configured to actuate a switch of the electronic circuit of the headphone, the electronic circuit being produced in such a way that the switch controls the on/off of the headphone in the case of long press, play/pause or answer/end call in the case of a short press,
the housing which at least partially houses the electronic circuit comprising a wall for closing a housing accommodating the electronic circuit, provided with a chamber which accommodates a board bearing said switch, the chamber being at least partially closed by the central part.

2. The headphone as claimed in claim 1, the internal memory being non-removable for a user.

3. The headphone as claimed in claim 1, each earpiece comprising a cushion of annular shape, with shape memory, designed to rest against a user's ear, mounted removably on the housing of the earpiece.

4. The headphone as claimed in claim 3, the earpiece housing having a peripheral groove, the groove being delimited on the cushion side by the edge of a support cup of a speaker and on the other side by an inner cover of the housing of the earpiece, the support cup having a periphery and a notch open on the periphery, facilitating an insertion of the cushion into the groove when mounting the cushion on the housing and/or facilitating a separation of the cushion from the housing.

5. The headphone as claimed in claim 1, the housing comprising a body having a lateral wall and an upper extension, for connection to the headband, molded as one piece with the lateral wall, the extension having an arcuate shape, and at least partially housing a telescopic slide

13 mechanism configured to adjust the height of the headband with respect to the housings of the earpieces.

6. The headphone as claimed in claim 1, the headband comprising a shape memory foam arranged between an outer support, of arcuate shape, and an inner bearing part, produced in an elastomeric material.

7. The headphone as claimed in claim 1, one of the housings of the earpieces comprising a removable cap defining an outer face, the removable cap allowing access, when removed, to a compartment housing a battery.

8. The headphone as claimed in claim 1, one of the two housings of the earpieces bearing a jack socket for outputting an analog audio signal and/or one of the two housings of the earpieces bearing a jack socket for inputting an analog audio signal.

9. The headphone as claimed in claim 1, the electronic circuit comprising an identifier which is specific to the headphone, the electronic circuit being configured to communicate the identifier to a terminal with which the headphone is paired, the identifier being stored in an encrypted manner in the memory of the headphone.

10. The headphone as claimed in claim 1, the electronic circuit comprising a Near Field Communication module.

11. The headphone as claimed in claim 1, the headband having a curvature about a first geometric axis contained in a median plane on either side of which the two earpieces are arranged, and a curvature about a second geometric axis contained in the same median plane but perpendicular to the first axis.

12. A method for near-instantaneously sharing an item of content between at least a first user and a second user each equipped with a stereo headphone comprising at least:
    two earpieces each having a housing,
    a headband connecting the housings of the earpieces,
    at least one electronic circuit housed at least partially in the housing of at least one of the earpieces, configured to pair the headphone with a remote terminal such as a cellular telephone and to establish a wireless link therewith, the electronic circuit comprising:
    an internal memory with more than 32 GB of capacity,
    an audio player to play audio files saved in the internal memory, and
    an interlace making possible to select, as the source to be broadcast in the earpieces, the audio player of the headphone or the paired terminal,
and with a terminal running a content-sharing application with which the headphone is paired, the first and second users having previously registered their headphone on a server, the method comprising the steps of:
    allowing the first user to select at least one item of content to listen to and at the least one second user with whom the first user wishes to share the listening to the item of content,
    uploading the item of content to a streaming server,
    relaying the item of content thus uploaded to the at least one second user.

13. The method as claimed in claim 12, comprising sending, to the at least second user selected for sharing the item of content, the URL of the shared stream, an identifier of the first user wishing to share an item of content and an identifier of the shared item of content, and also at least one out of the name of the shared track, the author of the track, a duration of the track, the number of people with whom the track is shared, the duration of the stream, the audio resolution, the name of the album, an image of the track's sleeve, the name of the publisher and/or of the record company.

14

14. The method as claimed in claim 12, wherein:
    A. in case a user selected for sharing the item of content has the content-sharing application already open on the terminal of said user, the application generates a visual, touch and/or sound notification inviting the user to listen to the shared item of content, and if the user accepts to start streaming the shared item of content, the application interrupts current listening in order to transmit the stream of the shared item of content to the headphone for the user to listen to,
    B. in case that the content-sharing application is not open on the user's terminal, the terminal displays a notification linked to the application which invites the user to open the application in order to listen to the shared item of content by streaming.

15. A method for authenticating a stereo headphone comprising at least:
    two earpieces each having a housing,
    a headband connecting the housings of the earpieces,
    at least one electronic circuit housed at least partially in the housing of at least one of the earpieces, configured to pair the headphone with a remote terminal such as a cellular telephone and to establish a wireless link therewith, the electronic circuit comprising:
    an internal memory with more than 32 GB of capacity,
    an audio player to play audio files saved in the internal memory, and
    an interface making possible to select, as the source to be broadcast in the earpieces, the audio player of the headphone or the paired terminal,
the headphone comprising a memory and an identifier stored in an encrypted manner in the memory, the method comprising the steps of:
    pairing the headphone with a terminal running an application,
    transmitting the encrypted identifier to the application,
    entering, in the application, a code provided with the headphone when the headphone is acquired,
    comparing the code with the identifier, this comparison being carried out automatically within the application, and in the case of a match between the code and the identifier, making it possible to register the headphone on a remote server.

16. The method as claimed in claim 15, the server storing the serial number of the headphone, an email address of a user associated with the headphone and the telephone number of the user.

17. The method as claimed in claim 15, wherein, in the case of the headphone being connected to an application which does not recognize the headphone following transfer of ownership of the headphone or theft thereof, the application asks a user of the headphone for the serial number of the headphone to allow the user to access the functionalities of the application.

18. A stereo headphone comprising at least:
    two earpieces each having a housing,
    a headband connecting the housings of the earpieces,
    at least one electronic circuit housed at least partially in the housing of at least one of the earpieces, configured to pair the headphone with a remote terminal such as a cellular telephone and to establish a wireless link therewith, the electronic circuit comprising:
    an internal memory with more than 32 GB of capacity,
    an audio player to play audio files saved in the internal memory, and an interface making possible to select, as the source to be broadcast in the earpieces, the audio player of the headphone or the paired terminal wherein the headphone comprises at least two buttons arranged on the housing of an earpiece, the electronic circuit of the headphone being configured such that continuous pressure on one of the buttons corresponds to an increase or decrease in volume depending on the button used, and a close in time double-press corresponds to moving to the next or preceding list, depending on the button used.

\* \* \* \* \*